(No Model.) 2 Sheets—Sheet 1.

D. DUNN.
AIR BRAKE FOR RAILWAY CARS.

No. 489,527. Patented Jan. 10, 1893.

WITNESSES:
F. L. Ourand
Jo. L. Coombs

INVENTOR:
Dennis Dunn
J. Siuis Jagger & Co.
Attorneys (No Model.) 2 Sheets—Sheet 2.

D. DUNN.
AIR BRAKE FOR RAILWAY CARS.

No. 489,527. Patented Jan. 10, 1893.

WITNESSES:
F. L. Ourand
W. L. Coombs

INVENTOR:
Dennis Dunn
By Suus Dagger & Co.
Attorneys

UNITED STATES PATENT OFFICE.

DENNIS DUNN, OF MAHANOY CITY, PENNSYLVANIA, ASSIGNOR OF ONE-HALF TO THOMAS GORMAN, OF SAME PLACE.

AIR-BRAKE FOR RAILWAY-CARS.

SPECIFICATION forming part of Letters Patent No. 489,527, dated January 10, 1893.

Application filed April 17, 1891. Serial No. 389,337. (No model.)

*To all whom it may concern:*

Be it known that I, DENNIS DUNN, a citizen of the United States, and a resident of Mahanoy City, in the county of Schuylkill and State of Pennsylvania, have invented certain new and useful Improvements in Air-Brakes for Railway-Cars; and I do hereby declare that the following is a full, clear, and exact description of the invention, which will enable others skilled in the art to which it appertains to make and use the same, reference being had to the accompanying drawings, which form a part of this specification.

My invention relates to improvements in air brakes for railway and other cars, the object being to provide simple and effective means for operating the same whereby I dispense with springs and other like appliances and set and release the brakes by the air pressure alone.

The invention consists in the novel construction and combinations of parts hereinafter fully described and specifically pointed out in the claim.

Figure 1:
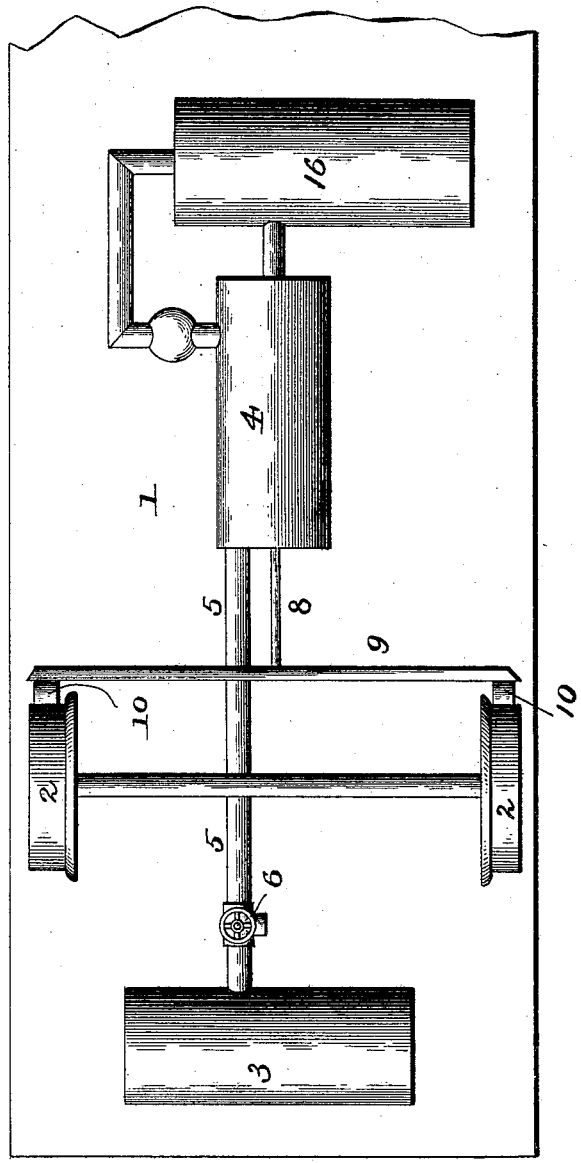
Figure 2:
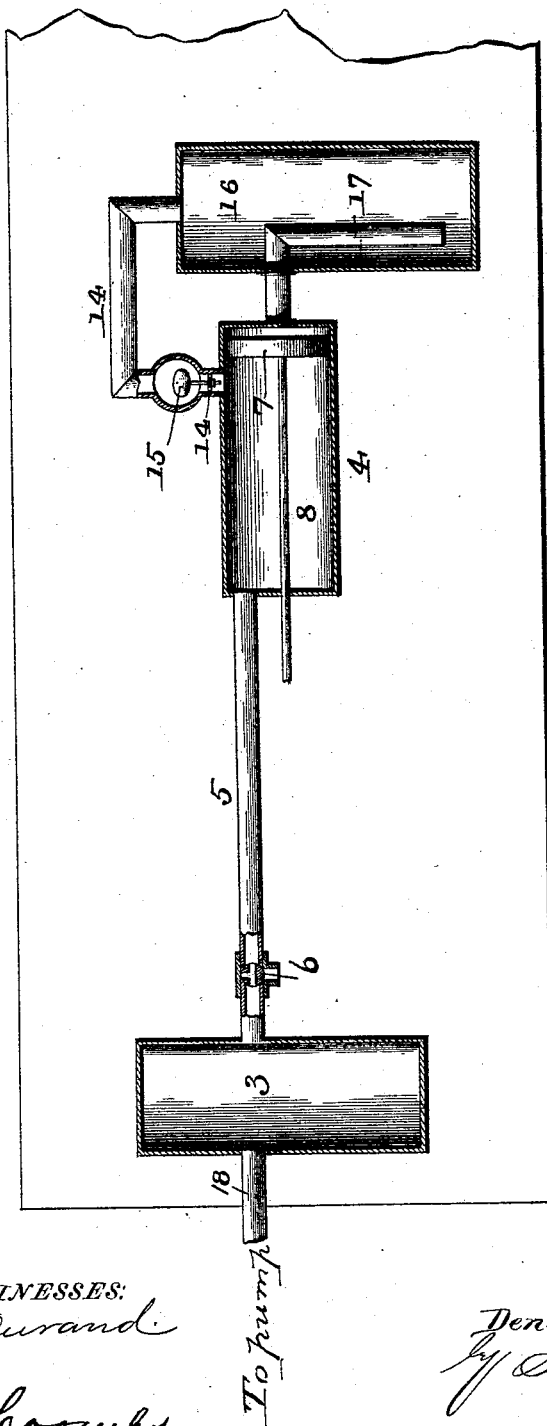
Figure 3:
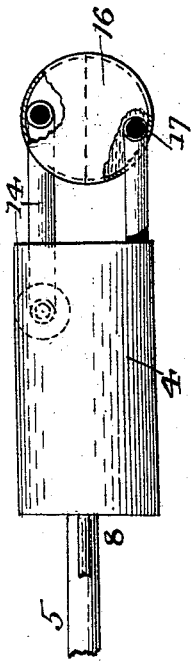

In the accompanying drawings: Figure 1 is a bottom plan view of a car with my improvements applied thereto; Fig. 2 is a horizontal section of the same. Fig. 3 is a detail side view partly in section.

In the said drawings, the reference numeral 1 designates the platform of a car, and 2 the wheels.

The numeral 3 designates the air tank or reservoir, which in this instance is shown as being connected with the car, but in practice will preferably be secured to the locomotive, and will be supplied with compressed air in the ordinary manner.

The numeral 4 designates the brake cylinder secured to the bottom of the car, and connected with the air tank 3, by means of pipe 5, provided with a three way cock 6, under control of the engineer or other person who operates the brakes. The brake cylinder is provided with a piston 7, and a piston rod 8, with a brake beam 9 carrying brake shoes 10. Near the end of the brake cylinder, opposite to where the pipe 5 enters the same is a pipe 14, provided with a check valve 15. This pipe 14, communicates with a liquid receptacle 16, at the upper part thereof above the level of the liquid contained therein which in turn communicates with the brake cylinder by means of bent pipe 17 located in the lower part of said receptacle.

The three way cock 6, above described is so constructed and arranged that when turned one way communication will be established between the air tank 3, and the brake cylinder, and when turned the other way to shut off communication therebetween, it will communicate with the atmosphere.

The check valve 15, is so constructed and arranged that when the three way cock is opened to allow air from the air tank to enter the brake cylinder, it will be opened also, and when communication between said tank and cylinder is shut off said valve will close.

The receptacle 16 is designed to be partly filled with glycerine or other suitable liquid. The numeral 18 designates the supply pipe, leading from the pump, not shown, to the main air reservoir, the pipe 17, being submerged therein, while pipe 14, is above the level thereof.

The operation is as follows: The air tank is supplied with compressed air in any ordinary or suitable manner. The three way cock is now turned so as to open communication between the tank and brake cylinder when the air will rush down into said cylinder and escaping through pipe 14, into the liquid receptacle, forcing the liquid contained therein up through pipe 17, into the brake cylinder underneath the piston, raising the latter and establishing an equilibrium of air pressure in the brake cylinder and liquid receptacle. This is the normal position of the parts, with the brakes released or the shoes thereof, out of contact with the wheels. When it is desired to set or apply the brakes, the three way cock is turned to cut off communication between the brake cylinder and air tank, and open communication with the atmosphere. This will relieve the brake cylinder of the air pressure, causing the piston to be forced outward and the brake to be applied, the check valve 15, closing by the back pressure in pipe 14. To release the brakes, cock 6, is turned back to normal, when the first operation will be repeated.

Having thus described my invention, what I claim is:

In an air brake the combination with the air tank and a pipe provided with a three way cock, the brake cylinder connected with said pipe and having piston and piston rod connected with the brake beam, the liquid receptacle, the air pipe provided with a check valve connected with the liquid receptacle at the upper part thereof and with the brake cylinder intermediate its ends and the liquid pipe located in the lower part of the liquid receptacle and connected and communicating with the brake cylinder, substantially as described.

In testimony that I claim the foregoing as my own I have hereunto affixed my signature in presence of two witnesses.

DENNIS DUNN.

Witnesses:
THOS. T. GORMAN,
JOHN T. QUIN.